United States Patent [19]

Wolff

[11] 4,176,989

[45] Dec. 4, 1979

[54] AUXILIARY DEVICE FOR BORING OF DOWEL HOLES IN BOARDS

[76] Inventor: Robert Wolff, im Kiesacker, Engeln, Fed. Rep. of Germany

[21] Appl. No.: 934,411

[22] Filed: Aug. 17, 1978

[30] Foreign Application Priority Data

Nov. 14, 1977 [DE] Fed. Rep. of Germany ....... 2750868
Feb. 27, 1978 [DE] Fed. Rep. of Germany ....... 2808277

[51] Int. Cl.$^2$ ........................ B23B 49/02; B23B 47/28
[52] U.S. Cl. ................................... 408/115 R; 33/189; 408/72 R
[58] Field of Search ................ 408/115 R, 115 B, 72; 133/174, 185, 189

[56] References Cited

U.S. PATENT DOCUMENTS

| 2,428,201 | 9/1947 | Cannarili et al. ................ 408/72 |
| 2,764,818 | 10/1956 | Gard ................................. 33/189 |
| 3,381,387 | 5/1968 | Landrum, Jr. .................... 33/189 |
| 3,674,376 | 7/1972 | Silken ........................... 408/115 R |
| 3,804,546 | 4/1974 | Boyajian ....................... 408/115 R |
| 3,923,413 | 12/1975 | Giles ............................. 408/115 B |

*Primary Examiner*—Harrison L. Hinson
*Attorney, Agent, or Firm*—Abraham A. Saffitz

[57] ABSTRACT

An auxiliary device for boring dowel holes in boards which are to be doweled together comprising a flat plate provided with a handle and having a centrally located guiding hole for guiding a boring tool, such as a drill, through the plate. Vertically projecting pegs are provided on each side of the flat plate to diametrically oppose the boring hole at equal distances therefrom, each peg being at the same height. One side of the flat plate is provided with a longitudinal slit in alignment directed radially toward the centrally located guiding hole. The narrow side of the board is placed at the rear of the flat plate with the pegs projecting downwardly to move the board between the pegs whereby the centrally located guiding hole is aligned at the center of the board in order that a dowel hole may be bored at the desired first location. The inside width of the longitudinal slit generally equals that of the inside width of the guiding hole with the aligned slit and guiding hole in perpendicular relationship to the contacting edge of the board to provide precise positioning of the dowel in the center of the board.

9 Claims, 20 Drawing Figures

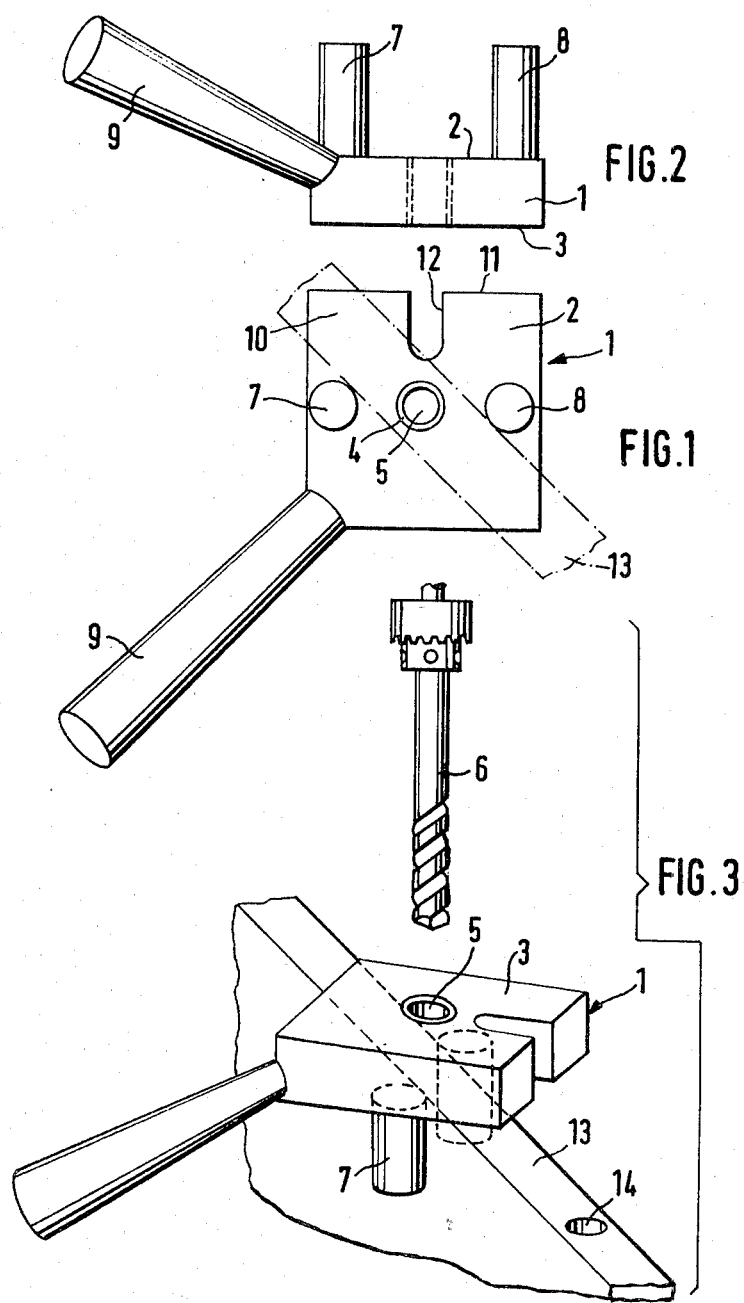

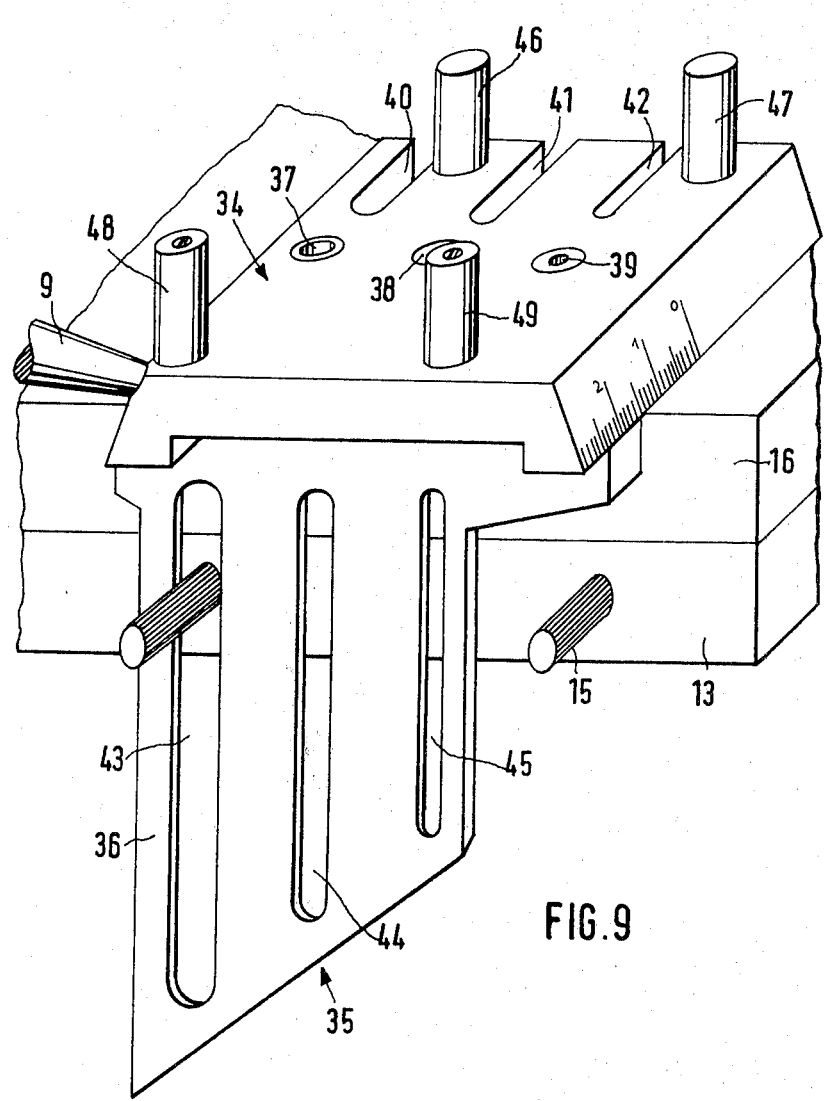

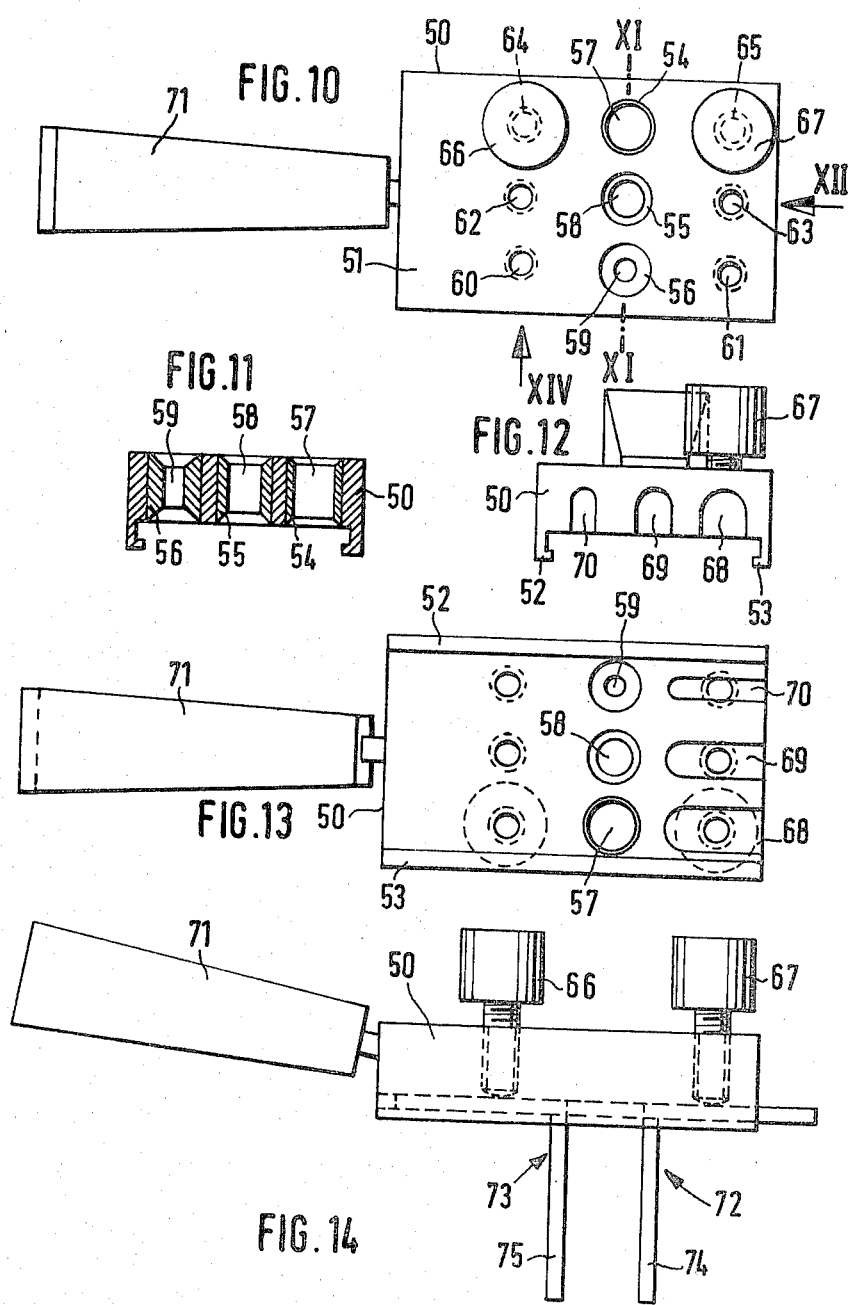

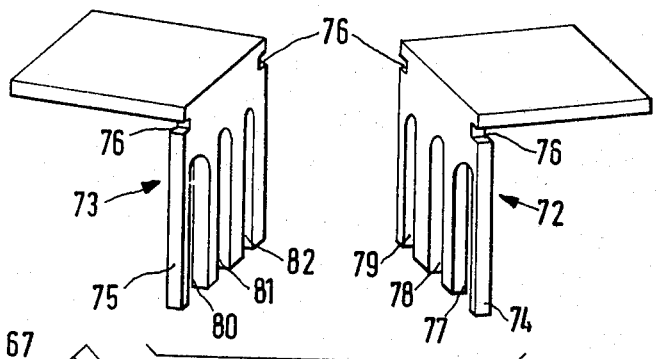
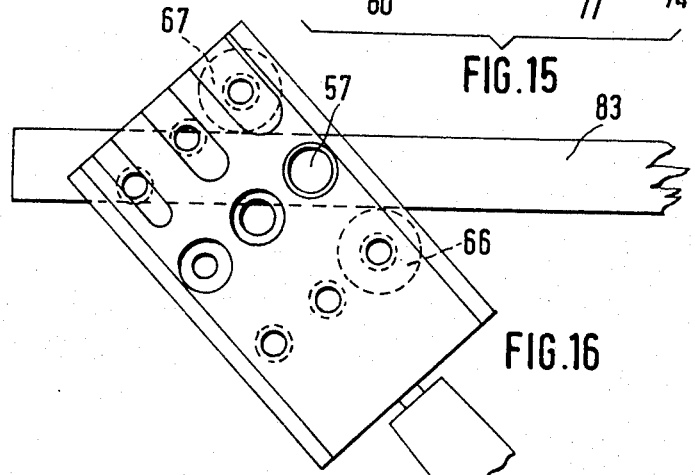
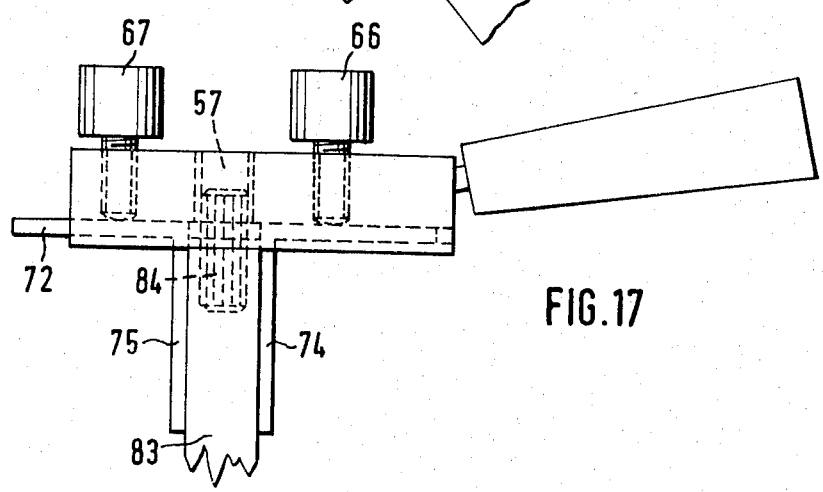

AUXILIARY DEVICE FOR BORING OF DOWEL HOLES IN BOARDS

CROSS REFERENCE TO RELATED APPLICATIONS

Reference is made to German Patent Application No. P 27 50 868.5 filed Nov. 14, 1977 in Germany and German Patent Application No. P 28 08 277.1 filed Feb. 27, 1978 in Germany and under which priority is claimed in accordance with 35 USC 119.

BACKGROUND OF THE INVENTION

1. Field of the Invention

The invention relates to the field of auxiliary devices for the boring of dowel holes in boards and in particular in the edges of boards which are to be joined together by means of a dowel.

2. Description of the Prior Art

In the manufacture of furniture, such as shelves or cupboards, dowels are often used for connecting the horizontal bottoms with the vertical walls of the furniture for which purpose groups of precisely aligned dowel holes must be bored into the front sides of the horizontal shelf bottoms and into the flat sides of the vertical walls of the furniture. The congruent arrangement of the group of holes in the two workpieces that are to be connected represents a time consuming and extremely difficult job for do-it-yourself craftsman which requires very precise measurements.

In West German Patent No. 24 37 724 there are disclosed auxiliary clamping devices of a type of C clamp which are modified to include boring bushings for guiding the boring tool in alignment with a plurality of boards clamped together in the desired position. With this known patented device doweling operations can be readily performed to provide an excellent fit with the bored panels being drilled on their flat sides and the bores lying close to the edge of the boards. However this known device is not helpful in cases where the board that is to be bored on the flat side must have the bore holes located at a larger distance from the edge of the bore than that location close to the edge. This is a serious drawback.

OBJECTS OF THE INVENTION

The invention has as its object creating a universally usable auxiliary clamping device used in conjunction with boring holes in boards or panels at a desired distance from the edge, said device having a precisely located guiding arrangement for the bore holes to assure that a board may be bored on the front side independently of its thickness and also to assure that the location of the boring may be made on the flat side of the board at any arbitrary distance from the edge. At the same time a pattern of holes is provided on the back side of the board which agrees precisely with the pattern of the holes developed on the front side of the board.

A further object of the invention is to provide an auxiliary guiding device that may be easily and comfortably handled by a do-it-yourself craftsman who wishes to carry out a boring operation for doweling boards together.

SUMMARY OF THE INVENTION

The invention comprises an auxiliary guiding device having a flat plate provided with a handle and a centrally located guiding hole for a boring tool, such as a drill, the centrally located guiding hole being lined with a bushing. The plate is provided, at one of its sides, with two round vertical pegs which are disposed diametrically in relation to and each at an equal distance from the bore hole. The flat plate is further provided with an elongated slit having an inside width equal to that of the guiding hole. Pegs serve as a dowel scanning part having a flat contact surface riding along the surface of the board. The longitudinal walls of the slit lie in planes which are oriented both in parallel to an axial plane of the guiding hole and perpendicular to the contact surface of the board. According to a special embodiment, the plate and dowel scanning part are developed in one piece whereby the slit is arranged on a narrow side of the plate and extends radially in the direction of the guiding hole.

The auxiliary device according to the invention offers a series of advantages. First, it allows a confortable, quick operation. In the first operating cycle, the board which is to be bored on its front side will be clamped down effectively standing on its edge and auxiliary device is put onto the board with the vertical pegs directed downwardly whereby said vertical pegs enclose the board between them. The plate then is swiveled by means of the handle until both vertical pegs fit against the board, after which the boring is accomplished with the drill passing through the guiding hole. The auxiliary device is then shifted further by hand from one doweling place to another and the next bore hole is bored under conditions so that maintaining a certain distance of the bore holes from the edge of the board as in the prior art guides is not required. As a result of the simultaneous contact of both vertical pegs with the sides of the board proper boring is assured independently of the thickness of the board and the guide hole is aligned directly to the middle of the board. After completing the boring operation the front of the board is given the required dowels and, while resting on the other board, the other board is clamped down together with the guide plate on the workbench. The plate with its guide slit is pushed over one of the projecting ends of the dowel and the bores in the second board that is to be bored on the flat side are then made with the guide right through the guiding hole. As a result of the individual scanning of the previously bored holes and of the dowels inserted into them, a very precise alignment of the existing rows of holes is guaranteed. Since the auxiliary device is developed in one part, no adjustments whatever are to be made on it and therefore this embodiment is distinguished by a very inexpensive producibility, and in many cases of doweling, by an extremely easy and quick manipulation.

According to an alternate embodiment, provisions may be made for the scanning part of the dowel to consist of a right angle plate, one leg of which is shiftable and arrestable in a guide on the underside of the plate and the other leg of which is provided with a longitudinal slit. This embodiment, too, is characterized by its easy manipulation. In the case of the board that is to be bored in front, the auxiliary device is used in the same manner as before, whereby the angle plate may be removed or may be allowed to remain on the plate, since it does not impede the execution of the first operating cycle. After the front of the board is bored and the dowels inserted, the auxiliary guide for doweling at flush edges is placed with its guiding hole on one of the inserted dowels. The plate is then pushed close to the board until contact is established with the projecting pegs in the downward position with the dowel fitting through the longitudinal slit. Subsequently, the board that is to be bored on the flat side is placed with its edges flush against the board that is to be provided with dowels on the front side. The auxiliary guide is then placed onto the second board in such a way that the plate, with its longitudinal slit, holds a dowel and the front, narrow side of the board fits against the leg of the flat plate with the pegs pointed downwards. By displacing it from dowel to dowel, the guiding hole of the auxiliary device can again be aligned for the correct places of boring for the borad that is to be bored on the flat side. This last embodiment is particularly suited for a board which is to be bored on the flat side in which the bore holes are to lie at a certain distance from the edge of the board.

Preferably, the auxiliary device of the present invention is equipped with both an adjustable angular shaped scanning part and a dowel scanning slit on the plate.

According to another embodiment of the invention, provision is made that the plate be provided with several guiding holes of various diameters which are disposed side by side and which lie centrally between two vertical pegs. The dowel scanning part has several parallel longitudinal slits of various width which are always aligned with one of the aforementioned guiding holes. By these measures one will achieve a useful device for all commercial boring diameters.

The handling of the above auxiliary device may be further simplified during drilling of the board to be processed on the front side by placing two identical right angle plates on the base plate in such a manner that both right angle plates can be inserted into the guide on the underside of the base plate with the two vertical pegs being fitted with set screws in order that the two angle plates may be secured to the plate. These two angle plates provide the advantage that only the first hole need be drilled in the board to be processed on the front side with the use of the two vertical pegs. In the case of boring additional holes, the two angle plates are clamped down in the auxiliary device as additional guide pieces enclosing the board between them so that the device may now be easily shifted along the front side of the board from one boring place to the next. The manipulation of the device is affected with only one hand and it is no longer such a difficult task for the less experienced do-it-yourself craftsman to align the auxiliary device precisely with the longitudinal center line of the front side of the board and to hold it firmly in position during the drilling process.

Where the flat guide plate is provided with several guide holes of various diameters which are disposed sided by side, provision may be made for each guide hole to lie centrally between two threaded holes which are developed in the flat guide plate and the two set screws may be changed from one threaded hole to another. The same auxiliary device may also be used for dowel holes of various sizes. However, a difference between the main embodiment using holes of the same size is the interchangeability of the set screws used as vertical pegs and the guide hole that is to be used at any one time. The guide hole must be identified unequivocally so that errors with regard to the guide hole to be used are minimized.

According to a further embodiment, provision is made for several longitudinal slits of various widths in both angle plates so that the legs are directed downwards whereby the slits, as a development of the two angle plates, are present when both angle plates are in reverse order to thereby facilitate the manipulation of the auxiliary device during boring of the flat side of a board. Boring is especially simplified in those cases where the bore holes are to be bored at somewhat larger distances from the edge of board. This will be described in greater detail in the description of the preferred embodiments.

Provision can also be made that the flat plate be developed on the underside as a continuous C-profile with the legs of the angle plates having logitudinal slits forming lateral guide grooves oposing each other so that the outside legs of the C-profile engage these slits. In this form it becomes simpler for the user to inspect the device to see that the angle plates are attached to the flat plate during a pertinent operating process. This embodiment provides for easy reproducibility of multi-boring operations.

BRIEF DESCRIPTION OF THE DRAWINGS

The invention will be explained in greater detail in the following paragraphs on the basis of several embodiments shown in the drawings.

FIG. 1 shows in top view a first embodiment of the boring auxiliary guiding device;

FIG. 2 shows a side view of the auxiliary device of FIG. 1;

FIG. 3 shows a perspective view illustrating the manipulation of the auxiliary device for processing a board which is to be bored on the front side or on one of the narrow sides;

FIG. 9 shows in perspective view a third embodiment of an auxiliary device according to the invention for the boring of three dowel holes of various diameters;

FIG. 10 shows a top view of a fourth embodiment of an auxiliary device;

FIG. 11 shows a sectional view along section line XI—XI of FIG. 10;

FIG. 12 shows a front view along section line XII—XII of FIG. 10;

FIG. 13 shows a bottom plan view of the auxiliary device of FIG. 10;

FIG. 14 shows a sectional view along line XIV—XIV of FIG. 10;

FIG. 15 shows a perspective view of two angle plates to be used with the auxiliary device of the invention;

FIG. 16 illustrates a stage of manipulation of the auxiliary device of FIG. 9 during boring of the first hole in a board that is to be processed on the front side;

FIG. 17 illustrates an adjustment of the auxiliary device for the boring of the additional holes in a borad that is to be processed on the front side;

DESCRIPTION OF THE PREFERRED EMBODIMENT

Figure 4:
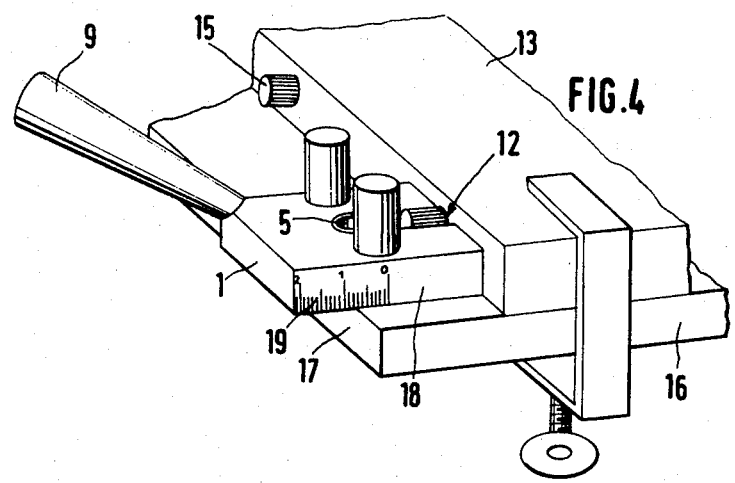
FIG. 4 shows an elevational view illustrating the manipulation of the auxiliary device during boring of the holes in the board that is to be doweled on the flat side.

The auxiliary device of FIGS. 1 through 4 consists essentially of a rectangular plate 1 having a flat top 2 and a flat bottom 3. In the middle of one side of plate 1 a guide hole 5 is provided for the boring tool, e.g., drill 6, and hole 5 is lined by a bushing 4. On both sides of the guide hole 5 the plate 1 is provided with two round perpendicularly projecting pegs 7 and 8 directly upwardly which are located at the same distance from hole 5 and in relation to hole 5 are diametrically opposed to each other. At one remote edge from the pegs and guide hole the plate 1 has a handle 9 which, in relation to the sides of the perpendicular pegs 7 and 8, is directly slightly obliquely and upwardly to facilitate gripping by the do-it-yourself craftsman.

On the side opposite the handle 9, in relation to the plane formed by the perpendicular pegs 7 and 8, the plate 1 is developed as a dowel scanning part 10 whereby the narrow side of the plate is parallel to the connecting line of the perpendicular pegs 7 and 8 and is developed as a flat contact surface of the board. In the dowel scanning part 10 of the plate 1 a longitudinal slit 12 leading to the contact surface 11 of the board is provided with the slit 12 directed radially toward the guide hole 5. Slit 12 has the same inside width as the guide hole 5.

The handling of the auxiliary device illustrated in FIGS. 1 through 4 is as follows:

During processing of the board 13, which is to be bored on the front side, the plate 1 is placed with the perpendicular pegs 7 and 8 directed downwardly and is put onto the narrow side of the board 13 where it is swiveled in the horizontal plane until the perpendicular pegs 7 and 8 fit against the opposite main sides of the board 13. In this fashion the guide hole 5 is aligned with the longitudinal middle of the narrow side of the board in a manner independent of the thickness of the board. After boring a dowel hole 14, the auxiliary device is shifted step by step for each hole along the board 13 and the additional dowel holes are bored. It is not necessary that a certain distance from the holes be maintained.

Subsequently the dowels 15, as shown in FIG. 4, are inserted into the bore holes 14 of the board 13 and the board 13 is then placed onto the board 16 which is to be bored on the flat side. After the auxiliary device is placed with the underside 3 of the plate 1 against the board 16, one of the dowels 15 engages the longitudinal slit 12. After fitting the dowel in the slit, board 13 is shifted, as shown in FIG. 4, as far to the right as the guide hole 5 permits so that the desired distance from the front edge 17 of the board 16 is reached. At the front and narrow side 18, which is parallel to slit 12, a scale 19 is provided from which the end placement may be read. After this operation, the two boards 13 and 16 are clamped together and the bores are made in the board 16, using the boring tool, whereby the auxiliary device is shifted from one dowel to the next.

The auxiliary device shown in FIGS. 1 through 4 may be made in one piece with the exception of the bore bush and preferably consists of a light metal casting or injection molded plastic. Although the drawing shows a solid material for the plate, it may be hollow in order to save material and weight.

In the embodiment of FIGS. 5 through 8 the auxiliary device consists essentially of a rectangular flat plate 20 having a central bore hole 5, perpendicular pegs 7 and 8, a handle 9 and a rectangular angle plate 21 having an upper leg 22 shiftably mounted in a guide on the underside of the flat plate. This leg 22 is divided into two prongs 23 and 24 enclosing within them the guide bushing 4. The prongs 23 and 24 have an approximately trapezoidal cross section and are countersunk in dovetail-shaped, undercut grooves on the side of the plate to receive the guide bushing 4. The perpendicular pegs 7 and 8 are provided with attachment means, e.g., a threaded section or nuts 25 and 26 for screws 27 and 28 which are guided on the pegs. The bottom ends of the said attachment means are guided on the pegs. The bottom ends of the said attachment means are aligned with the prongs 23 and 24 so that the angle plate may be securely supported on the plate 20. The forward leg 29 of the guide piece 21 is directed downwardly and is provided with a longitudinal slit 30. The inside of this forward leg 29 is developed as a contact surface 31 for the board. The longitudinal walls of the slit 30 lie in planes which are oriented both in parallel to an axial plane of the guide hole 5 as well as in planes oriented perpendicularly to the contact plane 31 for the board.

Figure 5:
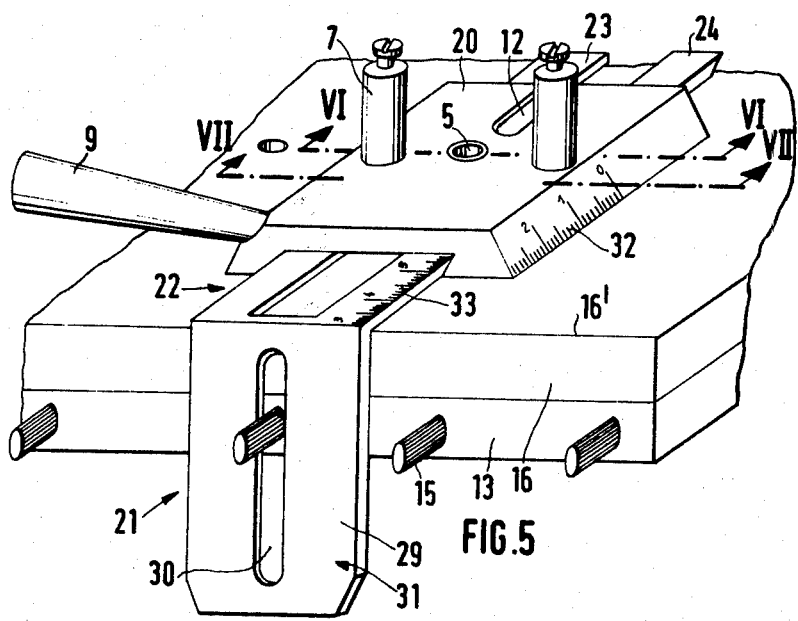
FIG. 5 shows a perspective view of a second embodiment which permits manipulation of the board during processing of a board that is to be doweled on the flat side.
Figure 6:
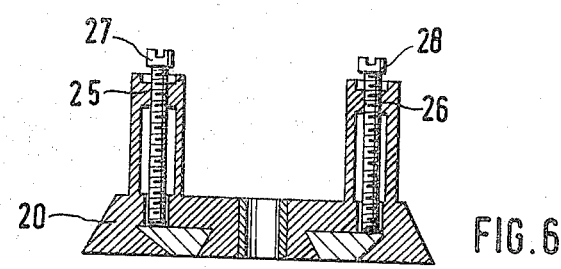
FIG. 6 shows a sectional view along section line II—II of FIG. 5.
Figure 7:
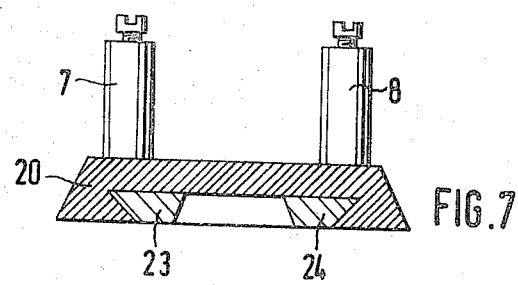
FIG. 7 shows a sectional view along section line VI—VI of FIG. 5.

The embodiment of the auxiliary device according to FIG. 5 is handled during the boring of the board 13 that is to be doweled on the front side in the same manner as explained in connection with FIG. 3. The angle plate 21, in this case, may be taken off the plate, if desired, or it may remain on the plate. After the dowels 15 are inserted into the dowel holes of the board 13, the board 16, which is to be bored on the flat side, is clamped together with the board 13 with its edges flush against the front side. Then the angle plate 21 is placed onto the front edge of the board 16 whereby one dowel 15 is received in the longitudinal slit 30. Afterward the plate 20 is shifted on the prongs 23 and 24 until the desired distance between the guide hole 5 and the forward edge 16' of the board has been obtained. To aid the adjustment of this distance on the plate 20 and the prongs 23 and 24, there are provided metric scales 32 and 33, as shown in FIG. 5. The plate 20 is now arrested in the adjusted position by tightening the screws 27 and 28 on the angle plate after which the readjustment of the auxiliary device is carried out in a stepwise manner from one dowel 15 to another dowel 15 and the bore holes are bored in the board 16.

Figure 8:
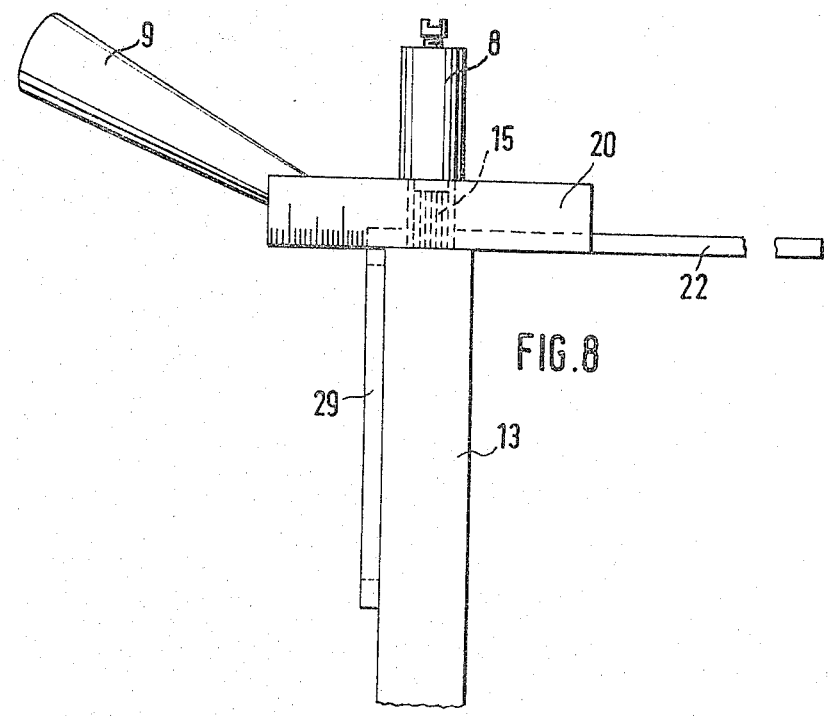
FIG. 8 shows a side elevational view of the auxiliary device of FIG. 5 and illustrates the adjustment of the auxiliary device for doweling together of two boards at an edge fitting.

Whenever two boards are to be joined together with flushed edges, the auxiliary device, after providing the board 13 with the dowels 15, is placed with its guide hole 5 over one of the dowels 15 as shown in FIG. 8. The angle plate is shifted upwardly in order to contact one of its perpendicular legs 29 against a main side of the board 13. The plate 20 is then arrested at the angle plate in the proper adjusted position. Whenever the board that is to be doweled on the flat side, with the auxiliary device adjusted in this manner, is provided with bores in the manner shown in FIG. 5, the embodiment of FIG. 8 guarantees that its bore holes will have the same distance from the edge of the board 16' as the bore holes 14 have from the edges of the board 13 which is to be doweled on the front side.

According to the preferred embodiment of FIG. 5, the plate 20 may also be provided with a dowel scanning slit 12 much in the same manner as the embodiment of FIGS. 1 through 4. In this variation the device of FIG. 5 may then be used without angle plate 21 for the processing of the board that is to be bored on the flat side. This operation is of advantage particularly when a series of bore holes are to be provided at a large distance from the edge 16' of the board.

In the embodiment of FIG. 9 the auxiliary device again consists of a plate 34 with handle 9 and an arrestable angle plate 35 guided shiftably on the underside of the plate with only the front leg 36 being shown as directed downwardly. The plate 34 is provided with a central line with three guide holes, 37, 38 and 39 which are always lined with a bore bushing and which have various diameters, as shown in FIG. 9. For each guide hole a dowel scanning longitudinal slit 40, 41 and 42 is assigned on the side of the plate. The slit 40, 41 or 42 always has an inside width equal to the diameter of the pertinent guide hole. Furthermore, in the leg 36 of the angle plate 35 there are provided three longitudinal slits 43, 44 and 45 of various widths which likewise are assigned to one of the guide holes 37, 38 and 39. On its top side the plate bears four perpendicular pegs 46, 47, 48 and 49, two of which are disposed on the narrow side having the mouth of the slits 40, 41 and 42, and the other two of which are disposed close to the opposite narrow side of the plate. The pair of perpendicular bolts 46 and 48 are disposed diametrically opposite the guide hole 37 which lies centrally between said pair. The pair of perpendicular bolts 46 and 49 are disposed correspondingly in relation to the guide hole 38 and, similarly, the pair of perpendicular bolts 47 and 49 are disposed diametrically in relation opposite the guide hole 39. The auxiliary device of FIG. 9 may thus be used for three sizes, e.g., three diameters of dowels. The handle of the device is the same as that of the embodiment of FIG. 5.

The auxiliary device of FIGS. 10 through 15 consists essentially of a rectangular plate 50 with a top 51 and a bottom in the form of a C-profile. At its underside the plate is developed as a C-profile with the outside legs 52 and 53 of the C facing each other. The plate 50 is provided, transversely to the longitudinal extension of its C-profile, with a series of guide holes 57, 58 and 59 of various sizes for bore holes of various diameters and each is lined with a respective guide bushing 54, 55 and 56. Each guide hole 57, 58 and 59 always lies centrally between two threaded holes 60 and 61, 62 and 63, and 64 and 65 developed in the plate which serve for the reception of two perpendicular pegs which are developed as set screws 66 and 67. In the set screw embodiment the set screws 66 and 67 are always screwed into the largest of the guide holes, 57, as shown in FIG. 14 whereby guide hole 57 lies between elements 64 and 65 (see FIG. 10).

On the underside of the plate 50 grooves 68, 69 and 70 are provided which open downwardly and toward one front side of the plate 50 which are always aligned with one guide hole 57, 58 or 59 in a longitudinal direction which have a width always equal to the diameter of the guide holes. On the opposite side the plate 50 has a handle 71 which is directed slantingly upwards. A right angle plate 72 or 73 is inserted into the C-profile from each side which angle pieces, in the position shown in FIG. 14, face each other with legs 74 and 75 pointing downwards. The legs 74 and 75 have been provided on their tops with grooves 76 for the reception of the outside legs 52 and 53 of the C-profile. Both legs 74 and 75 have furthermore been provided with three dowel scanning slits 77, 78 and 79, and 80, 81 and 82 which always have a width corresponding to the diameter of the guide holes 57, 58 and 59. The two angle plates 72 and 73 are developed homologously in relation to one another with regard to the sequence of the scanning slits. The angle plates 72 and 73 may always be arrestable by themselves on the plate 50 by means of set screws 66 and 67.

Figure 18:
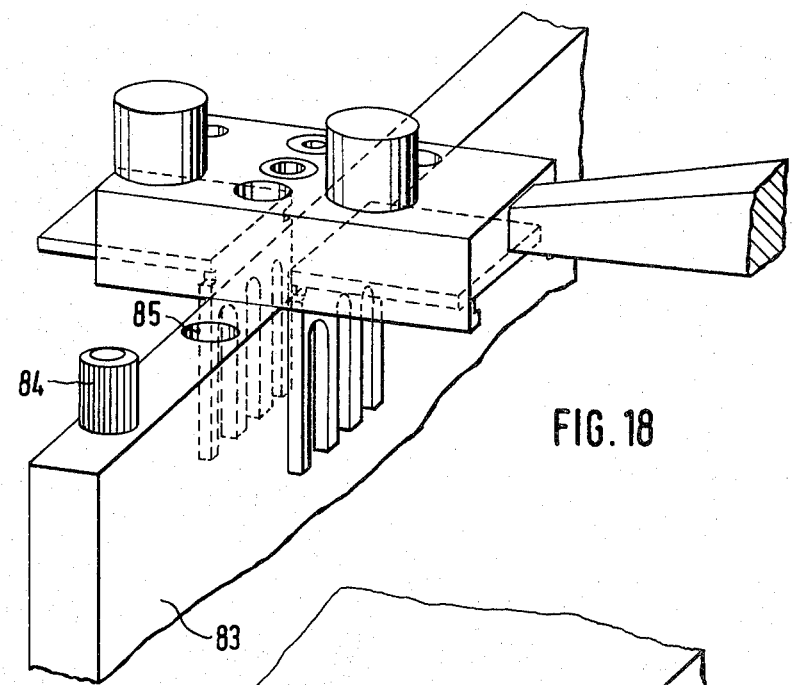
FIG. 18 shows a stage of manipulation of the auxiliary device for the boring of the additional holes in a board that is to be processed on the front side.
Figure 19:
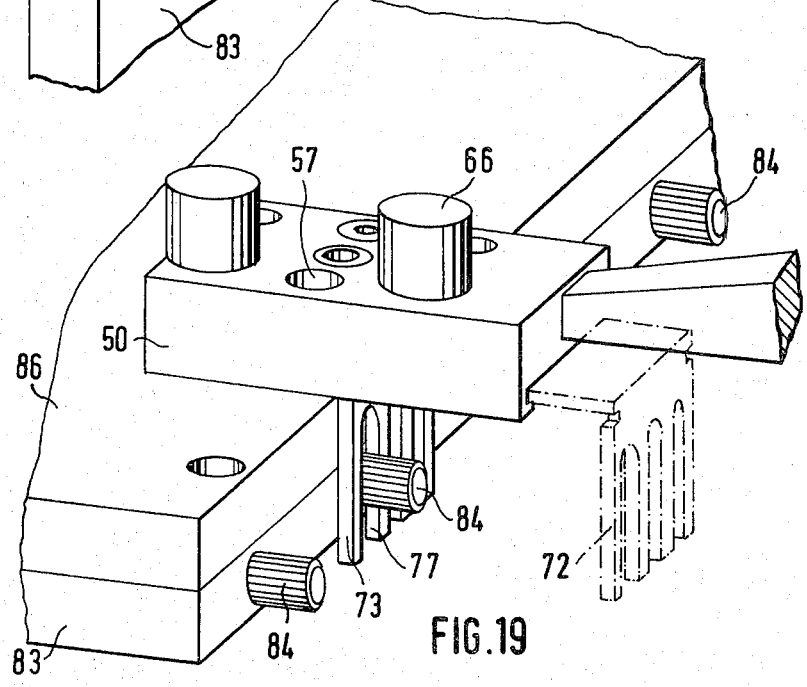
FIG. 19 shows the manipulation of the auxiliary device during boring of the board that is to be processed on the flat side.

The auxiliary device is handled as follows:

After screwing the set screws 66 and 67 into the two threaded bores enclosing the guide holes 57 to be used, the plate, normally with the angle plate 72 and 73 taken off, is put onto the front side of the board 83 that is to be bored on the front side with the set screw pointing downwards. The auxiliary device is swiveled until the two set screws 66 and 67 fit against the opposite main sides of the board 83, in which case the guide hole 57 is aligned precisely with the longitudinal middle of the board. Subsequently the first dowel hole is bored into which a dowel 84, as shown in FIG. 17, is then inserted. The auxiliary device is then placed onto the board 83 with screws 66 and 67 pointing downwards in such a way that the dowel engages with the bore hole 57. Now the two angle plates are moved until they make contact, with their two legs 74 and 75 pointed downwards, with the board 83 and are arrested by means of the set screws 66 and 67 in this position. Subsequently the auxiliary device is lifted off dowel 84 and then placed onto board 83 in the manner illustrated in FIG. 18, after which additional dowel holes 85 are bored in the board 83 which now all lie precisely in the middle of the board because they have been guided by the angle plates. Then the angle plate 72, at the largest distance from the handle, is lifted off while the other angle plate 73 is left in the position in which it was arrested previously in the case of the doweling of the board with flush edges. Then the board 86, which is to be bored on its flat side, is placed with flush edges onto the board 83, which has been completely provided previously with additional dowels 84, and is clamped down. The device is then placed, in the manner shown in FIG. 19, with its plate 50 onto the board 86 in such a way that the scanning slit 77 of the angle plate 73 assigned to the guide hole 57 always receives one dowel 84. As becomes immediately apparent from FIG. 19, the dowel pattern of the board 83 may be transferred quickly to the board 86.

When the doweling is not to be accomplished with flush edges but whenever the dowel holes in the board 86 are to lie at a somewhat larger distance from the edge of the board, then said distance may be adjusted over a certain area by suitable shifting of the angle plate 73. When still larger distances from the edge of the board are to be provided then instead of the angel plate 72, the other angle plate 73, shown in dash/dot lines in FIG. 19, may be used which, leading with its horizontal leg, may be inserted from the side of the handle into the C-profile on the underside of the plate 50 so that it can still be clamped down to plate 50, even in the case of a greater adjustment of the distance, by means of the set screw 66.

Figure 20:
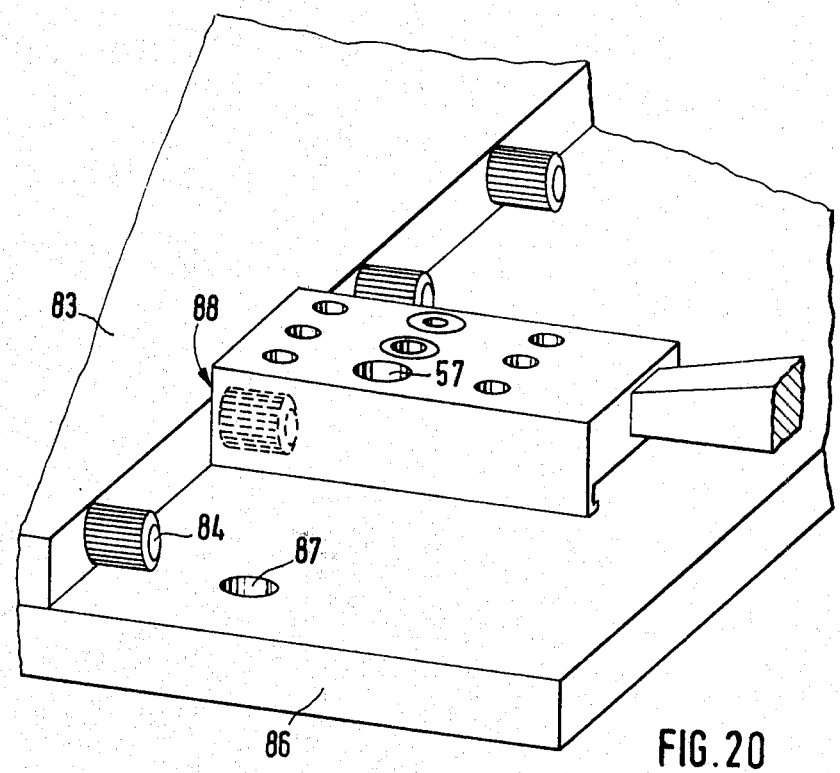
FIG. 20 shows the manipulation of the auxiliary device during boring of holes into the board that is to be processed on the flat side with the dowel holes being provided at a greater distance from the edge of the board.

FIG. 20 illustrates the handle of the device when a board 86, that is to be bored on the flat side, is to be provided with dowel holes 87 at a long distance from the edge of the board. In this case the front board 83, equipped with dowels 84, is placed onto the board 86 and the auxiliary device, with the angle plates 72 and 73 taken off, is placed onto the board 86 and fitted with the flat contact surface 88 of the board lying opposite the handle agaist the board 83 in such a way that its groove 88, corresponding to the pertinent guide hole, for example 57, (as also shown in FIGS. 12 and 13), receives a dowel 84. Now the drill is pulled out through the guide hole 57 and the pattern of dowel holes of the board 83 may be transferred quickly and precisely to the board 86 by shifting the device from dowel to dowel.

Having thus disclosed, I now claim:

1. An auxiliary device for the boring of dowel holes in boards that are to be doweled together comprising:
   a flat plate having a centrally located guide hole lined by means of a bore bushing for receiving a boring tool;
   said plate provided on one of its flat sides with two round projecting vertical pegs which are disposed diametrically opposite to and at equal distances from said guide hole;
   the space between said vertically projecting pegs forming a dowel scanning part having a flat board contacting surface lying on the surface of said plate;
   an elongated slit at a front edge of said plate having an inside width equal to that of the guide hole; and
   said slit having longitudinal walls which lie in two planes which are oriented both in parallel to one axial plane of said guide hole and perpendicular to the board-contacting surface of the dowel scanning part.

2. An auxiliary device as claimed in claim 1 wherein said plate and said dowel scanning part are developed in one piece and wherein said slit is disposed along a narrower side of said plate and extends radially in the direction of said guide hole.

3. An auxiliary device as claimed in claim 1 wherein said dowel scanning part consists of a right angle plate having two legs and guide, one leg being shiftable and arrestable in said guide on the underside of said flat plate and the other leg provided with a longitudinal slit.

4. An auxiliary device as claimed in claim 3 wherein said plate is provided with a plurality of guide holes, each of various diameters, which are disposed side by side and which lie generally centrally between a pair of vertical pegs, and said dowel scanning part is provided with a plurality of parallel longitudinal slits of various widths, each of which are aligned with the guide holes and which correspond in diameter and width.

5. An auxiliary device as claimed in claim 4 wherein said dowel scanning part slits are provided in said plate to permit adjustment of said dowel scanning part with respect to said plate in aligning the selected guide hole for boring of a hole.

6. An auxiliary device as claimed in claim 3 comprising two additional and equal right angle plates for fitting to the main plate, both of said additional plates being adapted to be slipped into the guide on the underside of the plate and said two vertical pegs are fitted with set screws by means of which the two angle plates may be fixed to the main plate.

7. An auxiliary device as claimed in claim 6 wherein said main plate is provided with a plurality of guide holes of various diameters which are disposed side by side with each guide hole lying centrally between two threaded holes developed in said main plate and including two set screws which may be changed selectively for shifting the pegs from one hole to another.

8. Auxiliary device as claimed in claim 7 wherein both angle plates are provided at their legs directed downwardly with longitudinal slits of various widths.

9. An auxiliary device as claimed in claim 8 wherein said main plate is developed on its underside as a continuous C-profile with outside legs and the legs of the angle plates are provided with longitudinal slits and lateral guide grooves opposing each other, said outside legs of the C-profile engaging said lateral guide grooves.

* * * * *